United States Patent
Zucker

(10) Patent No.: US 7,243,434 B1
(45) Date of Patent: Jul. 17, 2007

(54) LASER THEODOLITE AND KIT FOR CONVERTING A NEW OR PRE-EXISTING THEODOLITE INTO A LASER THEODOLITE

(76) Inventor: Fred Zucker, 18295 Lake Bend Dr., Jupiter, FL (US) 33458

( * ) Notice: Subject to any disclaimer, the term of this patent is extended or adjusted under 35 U.S.C. 154(b) by 0 days.

(21) Appl. No.: 11/328,695

(22) Filed: Jan. 8, 2006

(51) Int. Cl.
*G01C 15/00* (2006.01)

(52) U.S. Cl. ............... 33/292; 33/286; 33/DIG. 21

(58) Field of Classification Search ............ 33/227, 33/228, 286, 290, 291, 292, DIG. 21
See application file for complete search history.

(56) References Cited

U.S. PATENT DOCUMENTS

| | | | |
|---|---|---|---|
| 1,429,437 A | | 9/1922 | Kiefer et al. |
| 1,533,545 A | | 4/1925 | Geier |
| 3,471,234 A | | 10/1969 | Studebaker |
| 3,663,111 A | | 5/1972 | Tsuda et al. |
| 3,823,313 A | | 7/1974 | Unema |
| 3,874,087 A | | 4/1975 | Nunlist |
| 4,305,209 A | | 12/1981 | Yamashita |
| 5,159,760 A | * | 11/1992 | Spiegel et al. ............ 33/292 |
| 5,394,616 A | | 3/1995 | Claxton |
| 5,983,510 A | | 11/1999 | Wu et al. |
| 6,023,326 A | * | 2/2000 | Katayama et al. .......... 33/290 |
| 6,108,919 A | * | 8/2000 | Wu et al. ................ 33/292 |
| 6,151,788 A | * | 11/2000 | Cox et al. ........... 33/DIG. 21 |
| RE37,318 E | * | 8/2001 | Porter ..................... 33/290 |
| 6,513,251 B2 | * | 2/2003 | Huang et al. ............. 33/286 |
| 2003/0009891 A1 | * | 1/2003 | Ohtomo et al. ........... 33/286 |
| 2003/0061720 A1 | * | 4/2003 | Waibel .................... 33/281 |
| 2005/0022400 A1 | * | 2/2005 | Ritenour ................. 33/292 |

* cited by examiner

*Primary Examiner*—G. Bradley Bennett
(74) *Attorney, Agent, or Firm*—McHale & Slavin, P.A.

(57) ABSTRACT

The present invention provides a laser theodolite device and kit for converting a new or pre-existing theodolite into a laser theodolite. More specifically, in one embodiment, the laser theodolite device comprises a theodolite having a visible and/or reflective laser source integrally mounted within the theodolite telescope for generating a laser line along the centerline portion of the telescope line of sight. The kit for assembling a laser theodolite from a new or pre-existing theodolite includes a universally mountable bracket with a laser source secured thereto. The universal bracket is constructed and arranged to be mounted at a forward end of a theodolite telescope housing with the laser source being positioned at about a right angle with respect to the telescope centerline. A mirror mounted at about a forty five degree angle is adjustably positioned in the universal mount to reflect the laser beam produced by a laser source along the centerline portion of the line of sight of the theodolite's telescope lenses. Positioning of the laser beam to coincide with the telescope cross hairs is accomplished via adjustment screws provided on the mounting bracket.

21 Claims, 6 Drawing Sheets

LASER THEODOLITE AND KIT FOR CONVERTING A NEW OR PRE-EXISTING THEODOLITE INTO A LASER THEODOLITE

FIELD OF THE INVENTION

The present invention relates to alignment devices, more specifically to a theodolite/transit that includes a telescope and a laser indicator for visual reference, even more specifically to a kit for fitting a new or pre-existing telescope type theodolite/transit with a laser guiding indicator.

BACKGROUND OF THE INVENTION

Portable theodolites, or transits as they are commonly known, are used throughout the construction, carpentry and surveying trades as well as in other applications. The devices generally include a stand, such as a tri-pod to which the theodolite is pivotally mounted upon a top surface thereof for rotation about a horizontal and/or vertical axis. In operation, the devices are generally leveled manually using thumbscrews and the like in combination with fluid filled sight type level gauges. The theodolite generally includes a telescope in which cross hairs are positioned in the line of sight for use as a visual reference, allowing the person looking through the telescope to utilize the instrument for leveling and the like.

For example, U.S. Pat. No. 1,429,437, discloses a Convertible Builders Level and Transit. The device includes a base plate having a pair of mounts for a theodolite. The theodolite may be mounted in one position for upward movement and a second position for leveling.

U.S. Pat. No. 1,533,545, discloses a Convertible Level and Transit. The device includes a tripod which has a threaded stud for attachment to a leveling plate. The upper face of the plate includes a rounded boss upon which the base plate is mounted. The base plate includes leveling screws for leveling the theodolite device with respect to the ground surface. The base plate includes upstanding Y-forks upon which the theodolite may be mounted for upward pivoting in one position and fixed for leveling in a second position.

It is also known to provide an automatic leveling device in combination with a theodolite, to eliminate the manual leveling requirement. For example, U.S. Pat. No. 3,663,111, discloses a Self Leveling Transit Having a Locking Mechanism. The device includes a telescope incorporating therein an automatic level line compensator and means for locking the swinging portion of the compensator means. The telescope may be used as a transit when the lock is operative to lock the swinging portion of the telescope, and as a level when the lock is not in operation.

Laser technology has also been utilized for indicating a level reference plane. Within these devices portable laser emitters are used in place of the theodolite telescope to establish the reference plane. In the construction industry, narrow beams of collimated light, in the form of laser beams are being increasingly used in connection with establishing and marking long, straight, level lines, such as those required for markings for walls, ceilings, and/or floors. Also, laser beam projectors and receivers are often used in the construction industry and in agricultural land leveling applications to ensure that a target area is graded in the proper or desired slope or grade. The laser beam projector is placed in a known position and one or more sensors are placed in the targeted area to sense the impingement of the laser beam.

These devices generally include a laser source for generating a beam of collimated light and a rotating mechanism for rotating the beam of light about an axis to generate a plane of light. In order to provide a substantially level plane, it is necessary to have a known orientation for the laser plane with respect to the true earth reference. Typically, the laser plane is oriented into a level position with respect to the supporting surface, such as by manually leveling the mechanism, or by a self-leveling gyroscopic or magnetic mechanism. Additionally, some laser plane generators are operable to orient the laser plane at an angle with respect to a level orientation by rotating the laser generator about a desired axis according to the desire slope.

For example, U.S. Pat. No. 3,471,234, discloses a method and apparatus for performing precise surveying operations relative to a selected reference point by utilizing a laser beam. A portable laser beam reference plane generator is provided which may be set up in precise alignment with a selected reference point, and which produces a rotating laser beam sweeping over the adjacent terrain. The generator may be accurately adjusted to permit both elevation and angular displacements to be measured at any point within the area traversed by the rotating laser beam.

U.S. Pat. No. 5,394,616, discloses a Laser Positioning Device. The device includes a level having a pair of magnetic feet mounted thereto and a plate member mounted to one side to extend upwardly therefrom. The plate member is scribed with protractor markings for angular measurement. A pointer is pivotally associated with the apex of the protractor to which a laser beam generator is mounted. In operation, a laser beam from this generator can be impinged against a remote target location and an angle measurement may be taken from a known datum using the protractor.

U.S. Pat. No. 5,983,510, discloses a Three-Dimensional Laser Leveling and Angle-Calibrating Instrument with Multiple Functions. The device includes a stand and a pair of magnetically attachable laser levels. The stand includes a horizontal and a vertical plate to which the magnetic laser levels are attached. This construction permits one laser level to be used for horizontal leveling while the other is used for vertical leveling.

U.S. Pat. No. 3,823,313, discloses a Laser Fanning Device. The device includes a laser generator mounted on a conventional transit for rotation about a vertical axis. A crank is interconnected at one end to the support structure of the transit and at its other end to the drive of an electric motor affixed to the transit and laser generator. Operation of the motor and crank causes rotational and reciprocal movement of the transit and generator about an axis to develop a datum plane of light. A control knob provides grade adjustment and is linked to a digital counter to provide a visual readout of the grade.

While such laser projectors facilitate generating a laser plane at a desired grade and orientation, the higher number of moving parts, including the rotating mechanism, within the laser projector may raise reliability concerns over a prolonged period of time. Also, when sensors are not used to sense the laser beam, the reference plane generated by the rotated laser beam can be difficult to see with the human eye as the beam of light is intermittently flashed along a surface.

It is also known to combine a distance measuring instrument with a theodolite. For example, U.S. Pat. No. 3,874,087, discloses a Surveying Instrument. The device includes a theodolite and an electro-optical telemeter in which the transmitter and receiver of the telemeter are arranged in gravity-symmetrical relationship with respect to the horizontal axis of the theodolite. The transmitter and receiver are housed within a U-shaped body having a hole through which the theodolite fits. The device is held in place by dovetails mounted on the upper surface of the theodolite.

U.S. Pat. No. 4,305,209, discloses an Adaptor for mounting one instrument, such as an electronic distance measuring device, atop another instrument, such as a telescope or theodolite. The device includes a base member attached to the upper device. The base member includes two downwardly facing cam surfaces and support members engaging the cam surfaces for vertical movement against springs to counteract the forces produced by the upper instrument as it pivots while the device permits the two devices to be moved together about a horizontal axis.

U.S. Pat. No. 3,874,087, discloses a Surveying Instrument. The device includes a theodolite and an electro-optical telemeter in which the transmitter and receiver of the telemeter are arranged in gravity-symmetrical relationship with respect to the horizontal axis of the theodolite. The transmitter and receiver are housed within a U-shaped body having a hole through which the theodolite fits. The device is held in place by dovetails mounted on the upper surface of the theodolite.

As disclosed, the above devices fail to teach or suggest a theodolite having a telescope in combination with a laser emitter. The prior art is also deficient in teaching a theodolite having a laser positioned to project a laser beam along the centerline of the line of sight of the theodolite telescope for use as an external reference for marking the instrument line of sight. The prior art is also deficient in teaching a kit for fitting a new or pre-existing telescope type theodolite/transit with a laser indicator.

Accordingly, the instant invention provides a theodolite in combination with a laser emitting device. The instant invention provides optical indication through the theodolite telescope as well as external visual indication (a laser beam) along the centerline of the telescope line of sight. The instant invention also provides a kit for fitting a new or pre-existing theodolite with a laser indicator. The laser theodolite kit includes adaptability for installation on various theodolite configurations which may include theodolites with auto-focus or auto-leveling.

SUMMARY OF THE INVENTION

The present invention provides a laser theodolite device and kit for converting a new or pre-existing theodolite into a laser theodolite. More specifically, in one embodiment, the laser theodolite device comprises a theodolite having a visible and/or reflective laser source integrally mounted within the theodolite telescope for generating a laser line along the centerline portion of the telescope line of sight. Within this embodiment the laser diode may be mounted integral to the telescope, or alternatively, the laser source may be external to the theodolite and the laser beam may be transferred to the telescope via fiber optics. The theodolite may include a suspension, or automatic focus as is well known in the art.

The kit for assembling a laser theodolite from a new or pre-existing theodolite includes a universally mountable bracket with a laser source secured thereto. The universal bracket is constructed and arranged to be mounted at a forward end of a theodolite telescope housing with the laser source being positioned at about a right angle with respect to the telescope centerline. The laser source may include a diode secured to the mounting bracket, or alternatively, the laser source may be external to the theodolite and the laser beam may be transferred to the mounting bracket via fiber optics. A mirror mounted at about a forty five degree angle is adjustably positioned in the universal mount to reflect the laser beam produced by the laser source along the centerline portion of the line of sight of the theodolite's telescope lenses. Positioning of the laser beam to coincide with the telescope cross hairs is accomplished via adjustment screws provided on the mounting bracket.

Within either embodiment an energizing cable is connected between the laser and a power supply, and an externally operable activating switch is provided to control operation of the laser. In addition, any of the embodiments may include pinhole apertures and/or filters constructed and arranged to control and clarify the laser beam.

Accordingly, it is an objective of the present invention to provide a theodolite/transit having an integrally mounted laser for visual indication along the centerline of the the odolite telescope line of sight.

An additional objective of the present invention is to provide a theodolite having an integrally mounted fiber optic cable for transferring a laser beam from a remote source along the centerline of the theodolite telescope line of sight.

It is a further objective of the present invention to provide a kit for securing a laser beam emitter to a new or pre-existing theodolite.

A still further objective of the present invention is to provide a universally adjustable mounting device for removably securing a laser device to a new or pre-existing theodolite.

Another objective of the present invention is to provide a kit for securing a laser beam diode to a new or pre-existing theodolite telescope so that a laser beam is projected substantially along the centerline of the line of sight of the theodolite telescope.

Yet another objective of the present invention is to provide an improved theodolite which includes telescope cross hairs as well as laser beam visual indicators for precise mechanical alignment of machinery as well as surveying and construction uses.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
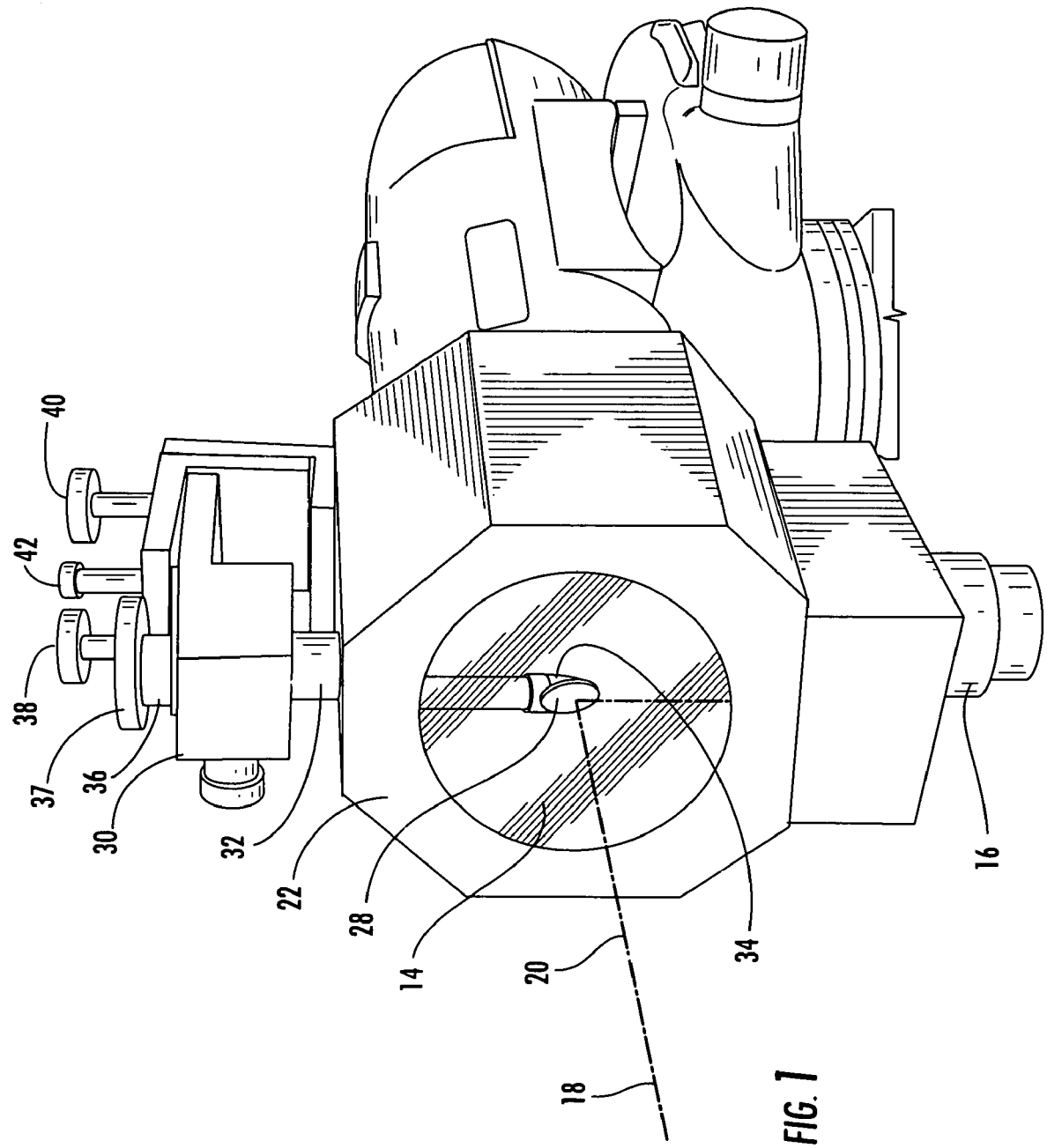
FIG. 1 is a perspective view illustrating one embodiment of the instant invention in cooperation with a theodolite.
Figure 2:
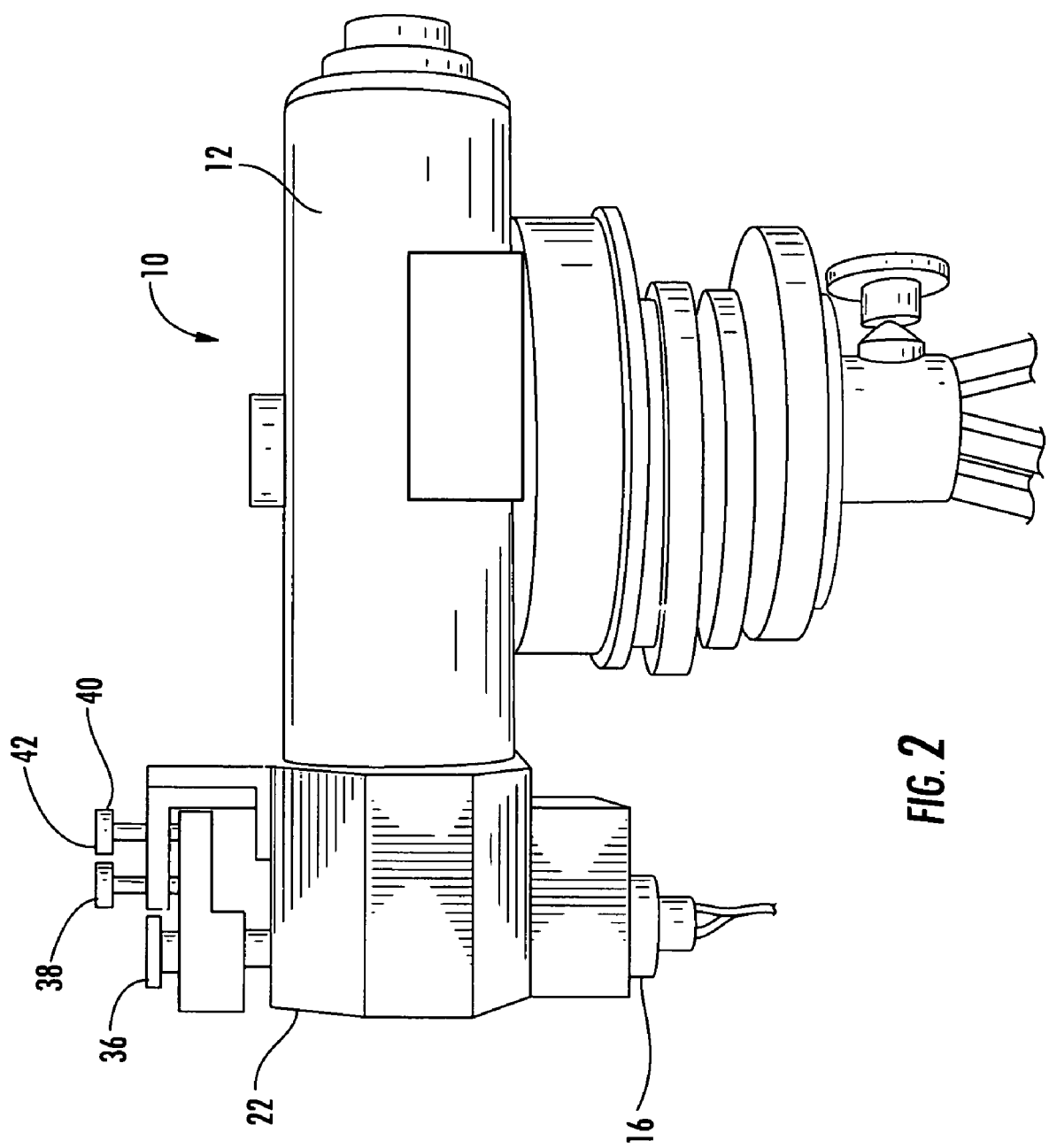
FIG. 2 is a side view of one embodiment of the instant invention in cooperation with a theodolite.
Figure 3:
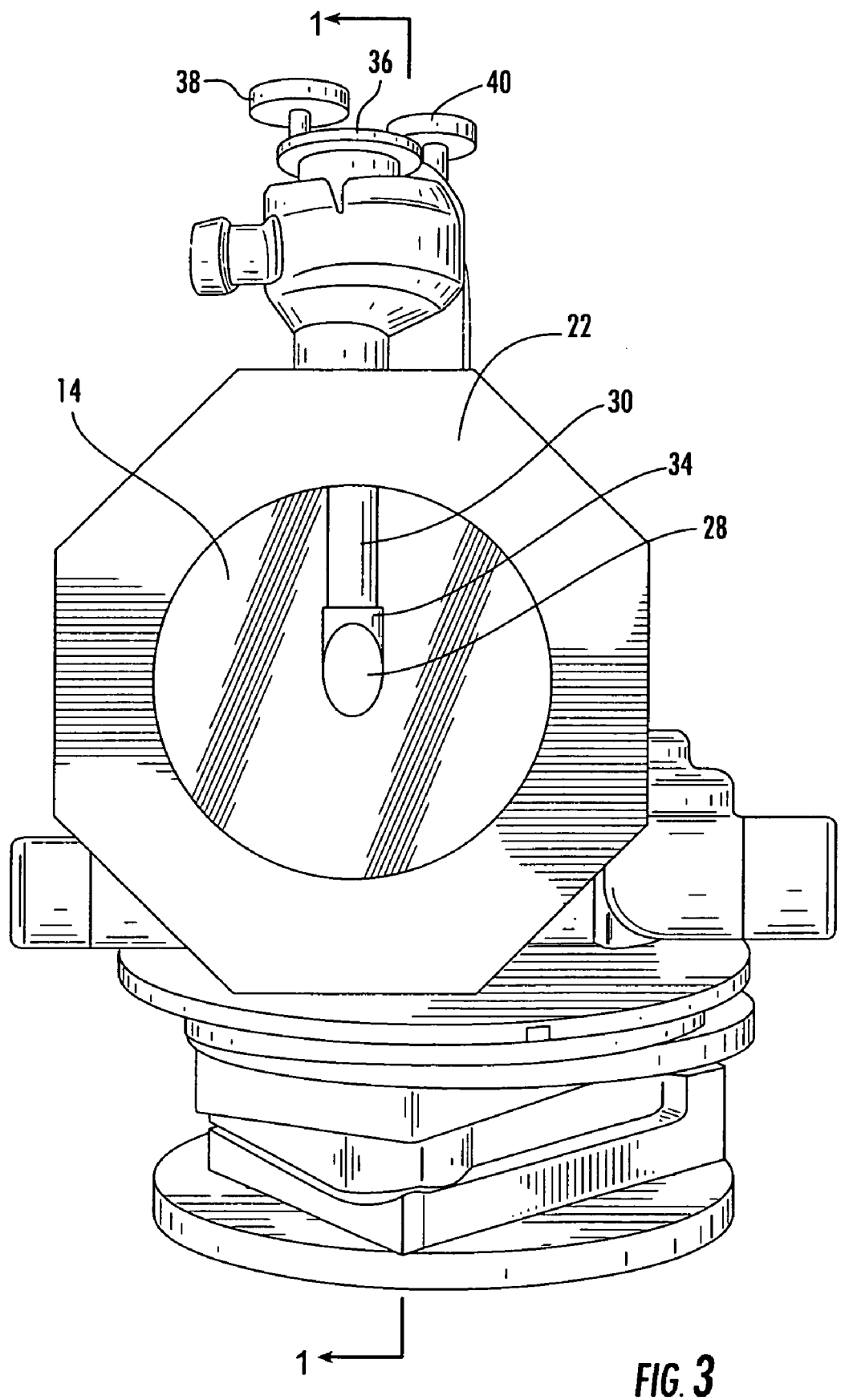
FIG. 3 is a front view of one embodiment of the instant invention in cooperation with theodolite.

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Referring to the Figures, there is shown a theodolite 10 having a telescope 12, the telescope including a plurality of lenses and/or prisms 14 arranged to make distant objects appear nearer. The instant invention provides a kit for securing a laser device 16 to the forward portion of the telescope for projecting a laser beam 18 substantially along the centerline of the line of sight 20 of the telescope. The kit includes a universal positioning means, illustrated herein as an annular shaped collar 22, for mounting the laser device to the telescope housing 24. The annular shaped collar may be provided with bushings (not shown) constructed and arranged with different internal bores for adapting the collar to a variety of telescopes. The universal positioning means includes a mirror 28 positioned at about a forty-five degree relationship with respect to the laser device 16. The mirror 28 is preferably secured at about a central portion of at least one of the telescope lenses 14 by a holder 30. The holder includes a stem 32 having a first end 34 and a second end 36, wherein the mirror is secured to the first end and the second end of the stem is rotatably secured within the holder. The rotational securement of the stem provides a means for rotatably adjusting the mirror. To provide controlled rotational adjustment, the second end of the stem may include a thumb wheel 37, wrench flats internal or external, screwdriver slot(s) or the like. In an alternative embodiment the outer surface of the stem may include threads constructed and arranged to cooperate with a threaded surface within the holder 30.

The collar 22 includes means for adjusting the projection path of the laser beam in horizontal and vertical directions, illustrated herein as an anchor 26 having threaded screws extending therethrough for abutting the holder. A first threaded screw 38 extends through the anchor 26 and abuts the holder for adjusting the path of the laser beam in a horizontal direction and a second threaded screw 40 extends through the anchor and abuts the holder for adjusting the path of the laser beam in a vertical direction. In one embodiment a third threaded screw 42 extends through the anchor 26 to provide a boss upon which the holder pivots. In this manner, rotation of the threaded screws causes the holder to move vertically and/or horizontally throughout a predetermined range. The anchor may be integrally formed to the collar or alternatively may be secured to the collar using suitable fasteners, adhesive, weldment or the like.

Figure 4:
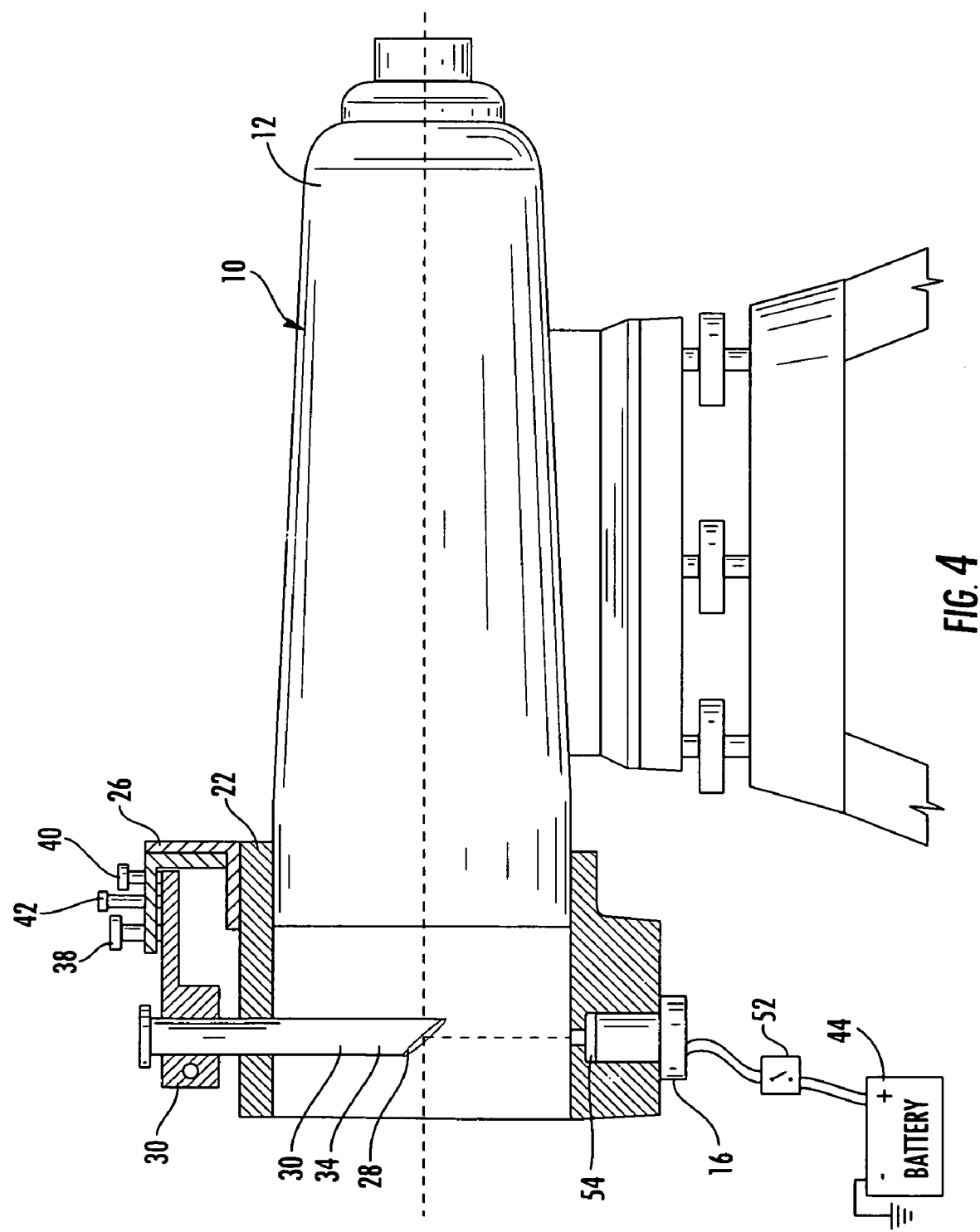
FIG. 4 is a side view of one embodiment of the instant invention partially in section taken along lines 1-1 of FIG. 3.
Figure 5:
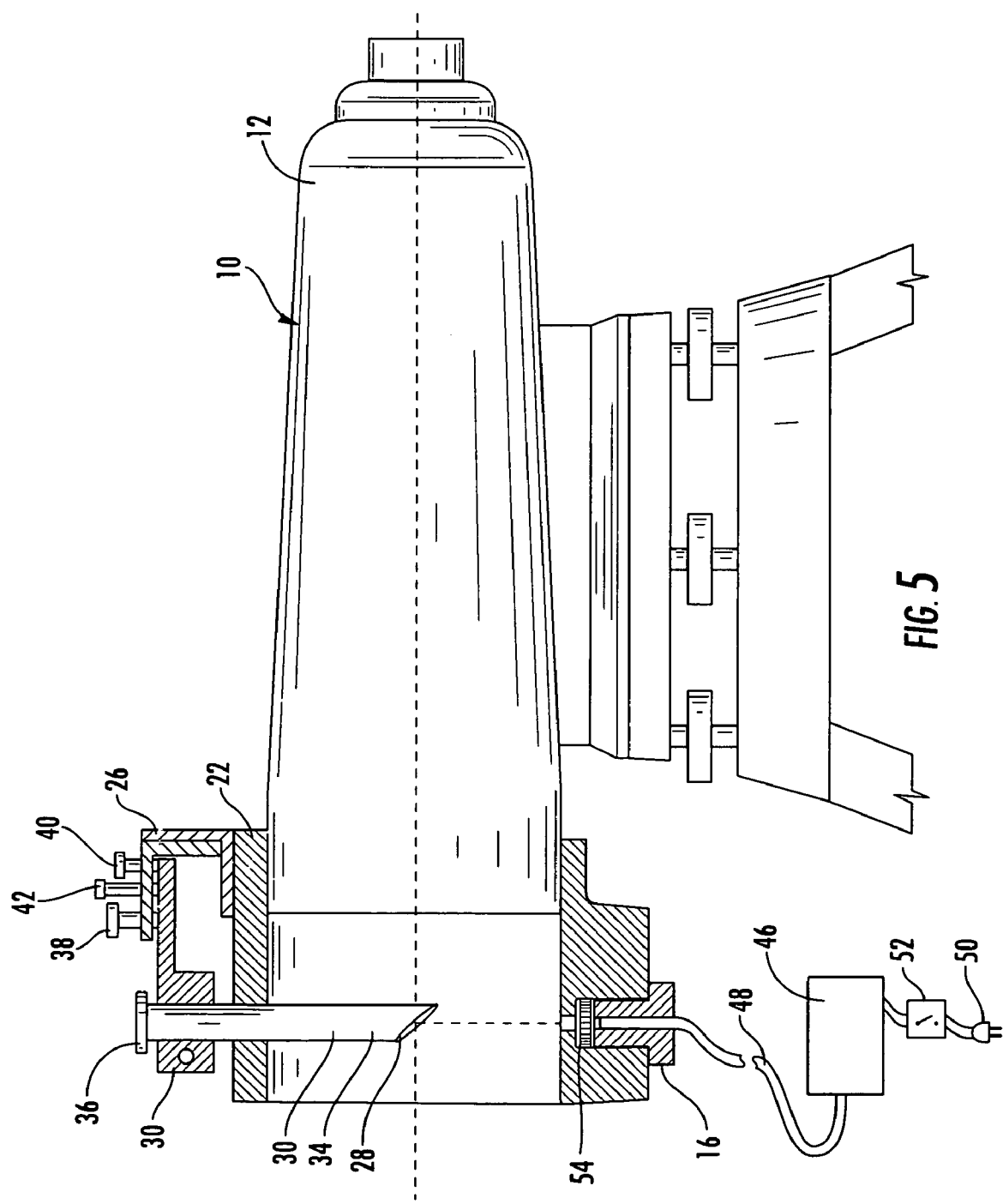
FIG. 5 is a side view of one embodiment of the instant invention partially in section taken along lines 1-1 of FIG. 3.

In one embodiment the laser device 16 is a laser diode connected to a conventional power supply which may be a battery 44, as shown in FIG. 4 or alternating current 50 as illustrated in FIG. 5. In an alternative embodiment, illustrated in FIG. 5, the laser device is a remote laser beam generator 46 connected to a fiber optic cable 48. The laser beam generator is preferably a Helium Neon type, however any type of laser beam generator of any power well known in the art suitable for producing a visible laser beam may be utilized without departing from the scope of the invention. The fiber optic cable is secured within the collar by means well known in the art which may include, but should not be limited to fasteners, collets adhesives, snap rings, o-rings and the like. The fiber optic cable is constructed and arranged to convey a laser beam from the remote laser device to the theodolite. The laser diode, as well as the remote laser device, may be provided with a switch 52 for connecting the laser device to the power supply. The switch may be of any type well known in the art suitable for controlling power supplied to the laser device. The laser device may also include optical focusing lenses, filters, beam expanders or pinhole orifices 54 to enhance the visibility and/or quality of the projected laser beam for various applications.

In operation, the cross hairs of the theodolite telescope are aligned with a target. Thereafter the projected laser beam is aligned with the cross hairs utilizing the threaded screws. The theodolite may then be tilted and/or rotated to any desired target and the laser beam will remain aligned with the theodolite telescope. In this manner, the telescope provides a visual reference when viewed through the plurality of lenses, and the laser device provides a visual reference along the centerline of the telescope line of sight when viewed either through the plurality of lenses or when viewed externally with respect to the telescope.

Figure 6:
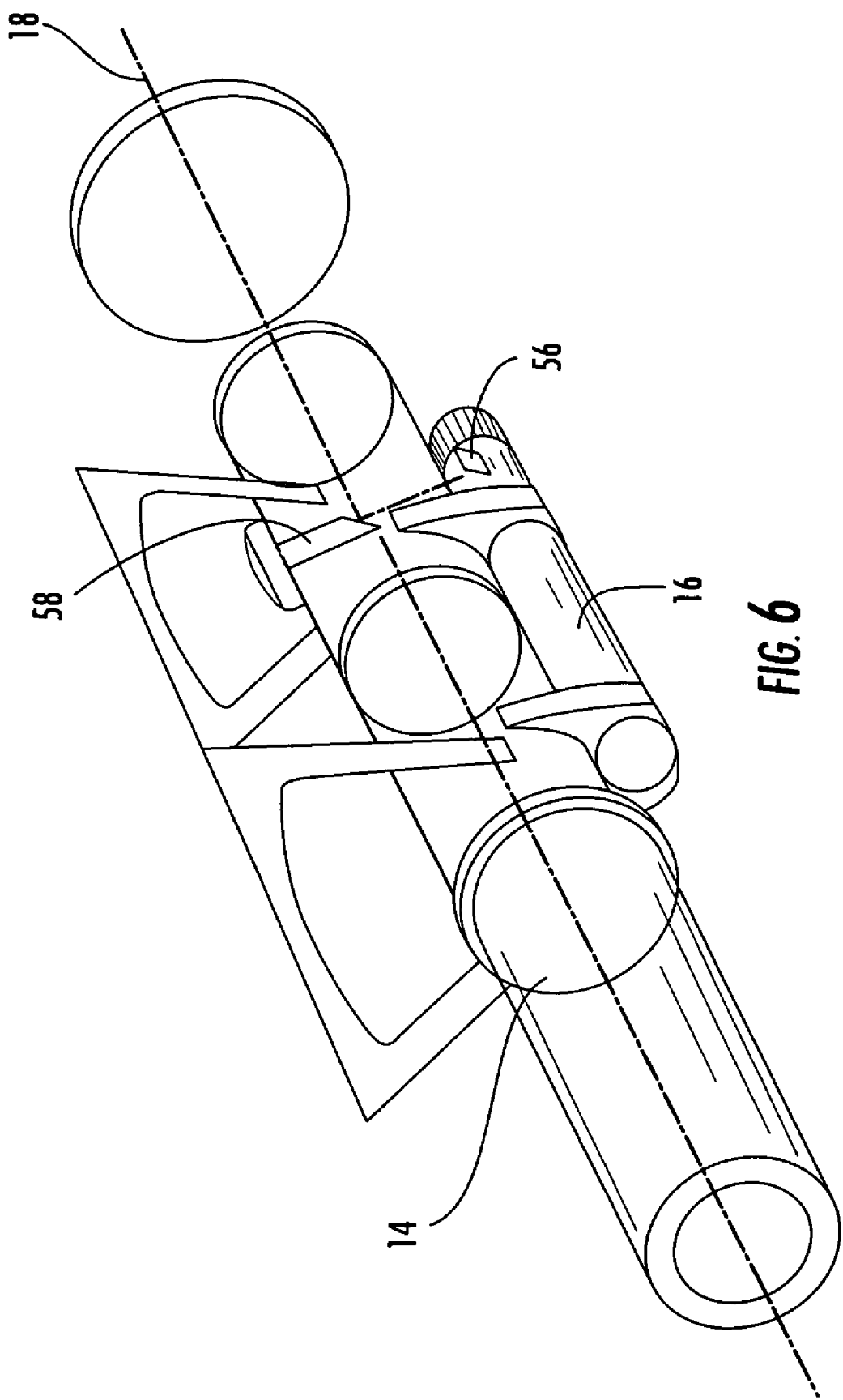
FIG. 6 is a partial perspective view of an alternative embodiment of the instant invention.

Referring to FIG. 6, a typical self-leveling suspension type theodolite is illustrated with the housing removed for clarity. Such self-leveling theodolites are currently available and sold under the names DAVID WHITE and TOPCON as well as others. The telescope of the theodolite is provided with a plurality of lenses 14 arranged to make distant objects appear nearer. Within this embodiment, the laser device 16 is preferably oriented parallel with the telescope to move with the telescope lenses for suspension utilization. The beam projected from the telescope reflects from a first mirror 56 oriented at about a forty five degree angle to a second mirror 58 also angled at about a forty five degree angle to reflect the laser beam 18 substantially along the centerline of the line of the telescope line of sight. Within this embodiment the laser beam may be aligned by rotation of mirrors 56 and 58. After alignment, which may be completed during assembly of the theodolite, the laser beam will be free to float with the telescope, thereby utilizing the self-leveling suspension.

One example of use for the instant invention includes propeller shaft bearing and engine alignment within large water craft. Within large water craft, the propeller shaft may extend fifty feet or more from the rear portion of the transmission or gearbox to the rear portion of the water craft. A plurality of bearings are arranged along the path of the shaft for supporting and guiding the shaft. For alignment, the shaft is removed and the instant invention is be positioned proximate to the most rearward bearing. By changing the focal length of the telescope the theodolite can be roughly centered to the bearing aperture using the visible cross-hairs. Further changing the focus allows the user to view through the bearings to rear of the transmission or gearbox. The theodolite is further centered and aligned by directing the laser beam through bearing fillers having pinhole apertures therethrough. In this manner the theodolite can be very precisely positioned. The center bearings can then be aligned by workers within the hull of the boat using the laser beam in conjunction with the bearing fillers. When all of the bearings are properly aligned the laser beam will project through all of the fillers to the rear of the transmission or gearbox giving a visual indicator that the bearing and the shaft are in proper alignment.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A laser theodolite comprising:
   a telescope, said telescope including a plurality of lenses arranged to make distant objects appear nearer, said telescope constructed and arranged for rotation about at least one axis;
   a laser device for projecting a laser beam substantially along the focal point axis of at least one of said telescope lenses, said laser device constructed and arranged for rotation with said telescope about said at least one axis;
   a means for selectively powering said laser device, whereby said laser device produces said laser beam when powered.

2. The laser theodolite of claim 1 wherein said laser device includes a universal positioning means for adjusting the path of said laser beam in horizontal and vertical directions.

3. The laser theodolite of claim 2 wherein said universal positioning means includes a mirror positioned at about a forty-five degree relationship with respect to said laser device, said mirror secured at about a central focal point axis of at least one of said lenses by a holder, said holder including at least one adjustable element between said holder and said telescope for producing relative motion between said mirror and said laser device.

4. The laser theodolite of claim 3 wherein said at least one adjustable element comprises at least one threaded screw, said at least one threaded screw extending through an anchor and abutting said holder for adjusting the path of said laser beam in said horizontal and said vertical directions.

5. The laser theodolite of claim 3 wherein said adjustable element comprises a first threaded screw extending through an anchor and abutting said holder for adjusting the path of said laser beam in a horizontal direction and a second threaded screw extending through said anchor and abutting said holder for adjusting the path of said laser beam in a vertical direction.

6. The laser theodolite of claim 3 wherein said universal positioning means includes a means for rotatably adjusting said mirror.

7. The laser theodolite of claim 6 wherein said means for rotatably adjusting said mirror includes a stem having a first end and a second end, wherein said mirror is secured to said first end of said stem and wherein said second end of said stem is rotatably secured within said universal positioning means.

8. The laser theodolite of claim 6 wherein said stem is threaded.

9. The laser theodolite of claim 1 wherein said laser means is a laser diode.

10. The laser theodolite of claim 1 wherein said laser means is a fiber optic cable constructed and arranged to convey a laser beam from a remote laser device.

11. The laser theodolite of claim 1 wherein said laser theodolite includes automatic leveling.

12. The laser theodolite of claim 1 wherein said laser device includes a first mirror positioned at about a forty five degree relationship with respect to said laser device, wherein a beam projected from said laser device is reflectively turned to about a perpendicular relationship with respect to a longitudinal centerline of said telescope, and a second mirror positioned at about a forty-five degree relationship with respect to said laser device, wherein said beam projected from said laser device is reflectively turned to extend along said longitudinal centerline of said telescope.

13. In a theodolite including a telescope having a plurality of lenses arranged within a housing to make distant objects appear nearer, a kit for securing a laser device to said telescope for projecting a laser beam substantially along the principal axis of said telescope comprising:
   a universal positioning means for mounting said laser device to said telescope housing including means for adjusting the path of said laser beam in horizontal and vertical directions;
   whereby said telescope provides a visual reference when viewed through said plurality of lenses and whereby said laser device provides a visual reference along said centerline of said telescope line of sight when viewed through said plurality of lenses or when viewed externally with respect to said telescope.

14. The kit for securing a laser device to a theodolite of claim 13 wherein said universal positioning means includes a mirror positioned at about a forty five degree relationship with respect to said laser device, said mirror secured along said principal axis of at least one of said lenses by a holder, said holder including and at least one adjustable element between said holder and said telescope for producing relative motion between said mirror and said laser device.

15. The laser theodolite of claim 14 wherein said at least one adjustable element comprises at least one threaded screw, said at least one threaded screw extending through an anchor and abutting said holder for adjusting the path of said laser beam in said horizontal and said vertical directions.

16. The laser theodolite of claim 14 wherein said adjustable element comprises a first threaded screw extending through an anchor and abutting said holder for adjusting the path of said laser beam in a horizontal direction and a second threaded screw extending through said anchor and abutting said holder for adjusting the path of said laser beam in a vertical direction.

17. The laser theodolite of claim 14 wherein said universal positioning means includes a means for rotatably adjusting said mirror.

18. The laser theodolite of claim 17 wherein said means for rotatably adjusting said mirror includes a stem having a first end and a second end, wherein said mirror is secured to said first end of said stem and wherein said second end of said stem is rotatably secured within said universal positioning means.

19. The laser theodolite of claim 18 wherein said stem is threaded.

20. The laser theodolite of claim 13 wherein said laser means is a laser diode.

21. The laser theodolite of claim 13 wherein said laser means is a fiber optic cable constructed and arranged to convey a laser beam from a remote laser device.

* * * * *